(12) United States Patent
Raymond

(10) Patent No.: US 12,017,294 B2
(45) Date of Patent: Jun. 25, 2024

(54) ELECTROMAGNETIC COMPONENTS COOLING APPARATUS, METHOD, AND CONFIGURATION

(71) Applicant: The ESAB Group Inc., Florence, SC (US)

(72) Inventor: Andrew Raymond, Lebanon, NH (US)

(73) Assignee: THE ESAB GROUP INC., North Bethesda, MD (US)

( * ) Notice: Subject to any disclaimer, the term of this patent is extended or adjusted under 35 U.S.C. 154(b) by 644 days.

(21) Appl. No.: 16/805,224

(22) Filed: Feb. 28, 2020

(65) Prior Publication Data

US 2021/0268596 A1    Sep. 2, 2021

(51) Int. Cl.
| | |
|---|---|
| *B23K 10/00* | (2006.01) |
| *B23K 9/10* | (2006.01) |
| *B23K 37/00* | (2006.01) |
| *H01F 27/24* | (2006.01) |
| *H01F 27/28* | (2006.01) |

(52) U.S. Cl.
CPC ............ *B23K 10/00* (2013.01); *B23K 9/1006* (2013.01); *B23K 37/003* (2013.01); *H01F 27/24* (2013.01); *H01F 27/28* (2013.01); *H01F 27/2876* (2013.01)

(58) Field of Classification Search
CPC ....... B23K 10/00; B23K 9/1006; H01F 27/24; H01F 27/2876
See application file for complete search history.

(56) References Cited

U.S. PATENT DOCUMENTS

| | | | | |
|---|---|---|---|---|
| 4,602,140 A | * | 7/1986 | Sobolewski | ........... H05B 6/108 219/630 |
| 4,855,552 A | * | 8/1989 | Marceau | ................ B01D 3/322 219/674 |

(Continued)

FOREIGN PATENT DOCUMENTS

| | | |
|---|---|---|
| EP | 3012058 A1 | 4/2016 |
| KR | 20030017729 A | 3/2003 |

(Continued)

OTHER PUBLICATIONS

Notification of Transmittal of International Search Report and Written Opinion including International Search Report and Written Opinion for International Application No. PCT/US2021/018472 dated Jul. 9, 2021, 14 pages.

(Continued)

*Primary Examiner* — Jimmy Chou
(74) *Attorney, Agent, or Firm* — Edell, Shapiro & Finnan, LLC

(57) ABSTRACT

An electromagnetic component assembly disposed in a power source of a welding or cutting system. The electromagnetic component assembly includes a core and a tubular winding. The tubular winding is placed near or around the core and conducts a current for an electromagnetic operation. The tubular winding includes a passageway for a process fluid, an inlet, at one end of the passageway, that receives the process fluid, and an outlet, at another end of the passageway, that directs the process fluid downstream toward a torch assembly. The passageway enhances cooling of the electromagnetic component assembly as the process fluid travels through the passageway from the inlet to the outlet.

20 Claims, 9 Drawing Sheets

(56) References Cited

U.S. PATENT DOCUMENTS

| | | | |
|---|---|---|---|
| 5,444,229 A * | 8/1995 | Rudolph | F24H 1/101 |
| | | | 219/629 |
| 6,130,818 A | 10/2000 | Severson | |
| 7,573,000 B2 | 8/2009 | Blankenship et al. | |
| 7,796,005 B2 | 9/2010 | Blankenship et al. | |
| 8,269,592 B1 | 9/2012 | McCauley, IV et al. | |
| 8,338,749 B2 | 12/2012 | Smith | |
| 9,924,567 B2 | 3/2018 | Ignatowski et al. | |
| 10,080,297 B2 | 9/2018 | Wu et al. | |
| 10,610,983 B2 | 4/2020 | Melius et al. | |
| 2003/0000945 A1 * | 1/2003 | Pilavdzic | H05B 6/14 |
| | | | 219/601 |
| 2003/0121908 A1 * | 7/2003 | Pilavdzic | B29C 48/832 |
| | | | 219/630 |
| 2004/0084443 A1 * | 5/2004 | Ulrich | H05B 6/36 |
| | | | 219/672 |
| 2004/0178874 A1 | 9/2004 | Kaifler | |
| 2005/0133201 A1 | 6/2005 | Liu | |
| 2006/0255029 A1 * | 11/2006 | Bone, Jr. | H05B 6/105 |
| | | | 219/672 |
| 2007/0268673 A1 | 11/2007 | Ankireddi | |
| 2008/0061048 A1 | 3/2008 | Borowy et al. | |
| 2011/0115378 A1 | 5/2011 | Lubomirsky et al. | |
| 2011/0284527 A1 | 11/2011 | Holverson et al. | |
| 2014/0008354 A1 | 1/2014 | Pletcher et al. | |
| 2015/0257207 A1 * | 9/2015 | Akers | H05B 6/101 |
| | | | 219/645 |
| 2016/0157331 A1 | 6/2016 | Matsumaru | |
| 2016/0183330 A1 | 6/2016 | Sigl | |
| 2016/0314897 A1 * | 10/2016 | Misaki | H01F 27/29 |
| 2017/0266752 A1 | 9/2017 | Apel et al. | |
| 2018/0050426 A1 | 2/2018 | Sigl et al. | |
| 2018/0079022 A1 | 3/2018 | Hsu | |
| 2019/0103218 A1 | 4/2019 | Sigl | |

FOREIGN PATENT DOCUMENTS

| | | | | |
|---|---|---|---|---|
| KR | 2003017729 | * | 5/2003 | H01F 27/08 |
| KR | 20030067961 A | | 8/2003 | |
| KR | 20060108089 A | * | 10/2006 | G07D 1/04 |
| KR | 20070104695 | * | 4/2007 | H01F 27/0013 |
| WO | WO-2013173105 A1 | * | 11/2013 | H01F 27/08 |
| WO | WO-2014121100 A1 | * | 8/2014 | H01F 17/0013 |

OTHER PUBLICATIONS

Extended European Search Report from the European Patent Office for European Patent Application 19195730.7 dated Feb. 13, 2020, 9 pages.

* cited by examiner

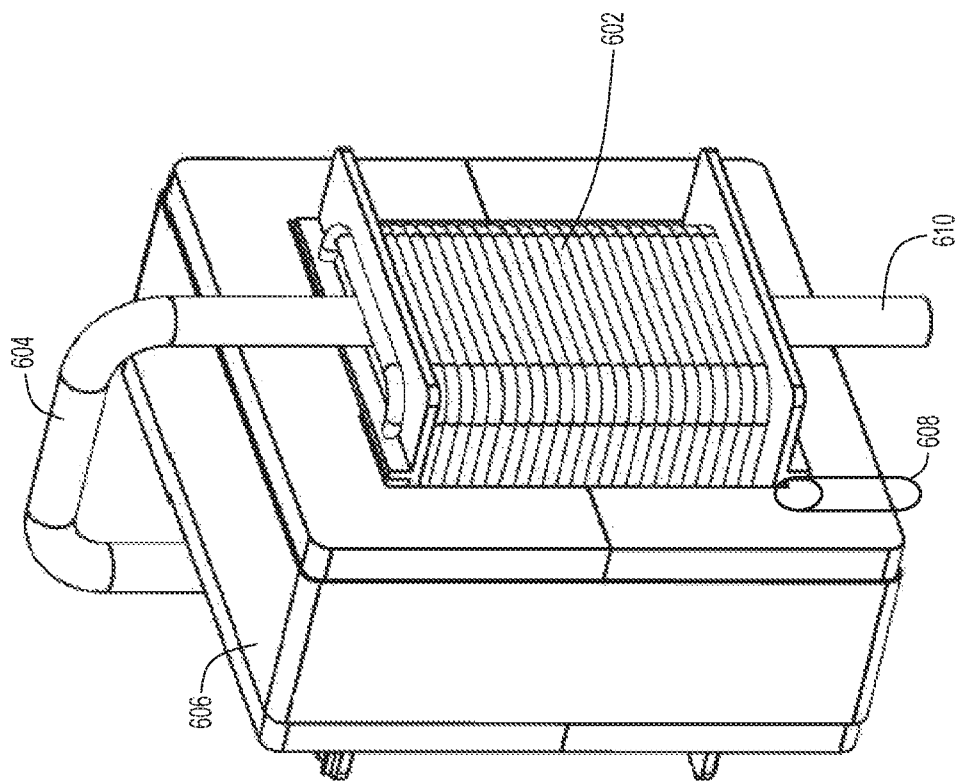

ELECTROMAGNETIC COMPONENTS COOLING APPARATUS, METHOD, AND CONFIGURATION

TECHNICAL FIELD

The present disclosure is directed toward power sources for welding and/or cutting systems and, in particular, to an apparatus, method, and/or configuration for cooling one or more electric components disposed within a power source for a welding and/or cutting system.

BACKGROUND

Welding and cutting systems, such as plasma cutting systems, typically include multiple interconnected components. For example, a plasma cutting system may include a power source that interconnects a supply of process fluid or gas, a torch assembly, and a clamp. Then, during welding or cutting operations, electrical components (e.g., resistors, capacitors, integrated circuits, computing components (e.g., microprocessors), etc.) in the power source can be manipulated/controlled (e.g., in response to trigger signals, inputs at a control panel, etc.) to control a supply of process fluid or gas and a supply of electricity to the torch assembly. For example, many cutting and welding power supplies utilize one or more electromagnetic components, such as one or more transformers and/or one or more inductors, to produce the voltage and/or current needed for welding or cutting operations. Unfortunately, the electrical properties of electromagnetic components can vary across different temperatures (and especially at higher temperatures), which can cause the components and/or the welding/cutting power supply in which they are included to become unreliable during use and change electrical properties (when temperatures rise).

Accordingly, these electromagnetic components should be cooled properly in order to operate effectively, insofar as the term "cooled" or variations thereof, as well as the terms "heat," "heat transfer," and variations thereof, are used herein to indicate a transmission of power. For example, the phrase "electrical components must be cooled properly" may indicate that power must be transferred away from electrical components via a media (e.g., air or water) in order to maintain the electrical components at a suitable operational temperature.

Often, these electrical components are cooled by a subsonic flow of ambient air that is forced through the power source with a fan. For example, a fan may propel ambient air into contact with a heat sink that is in thermal communication with the electrical components disposed in a power source to transfer heat away from the electrical components. Unfortunately, typically, cooling technologies that use forced subsonic flows (e.g., fan-propelled ambient air) have limited convection coefficients in the range of approximately 25-250 Watts per square meter for a temperature difference of one degree Kelvin ($W/m^2K$). Moreover, cooling electrical components with ambient air may introduce contaminants into the power source and, thus, the electrical components may need to be partitioned from a flow of ambient air. However, this partitioning may increase the weight of a power source and increase wire harness runs, which is undesirable for at least power sources that are intended to be portable. In fact, a fan that forces ambient air into a power source may also increase the weight and/or cost of manufacturing of a power source; and, unfortunately, it is difficult to reduce the weight and/or cost of a power source's fan without creating an undesirable decrease in the amount of cooling airflow that is introduced into the power source.

In some cases, forced ambient airflows are replaced or enhanced with forced liquid cooling systems to increase the amount of cooling provided within a power source. Unfortunately, these technologies often require yet additional components to be included in the power source and can be more expensive and complicated to implement as compared to forced subsonic flows and still require a user to maintain a heat exchange by blowing out particulates to keep them efficient.

Thus, power source cooling configurations and/or apparatuses, as well as methods of cooling a power source, that improve cooling for the electromagnetic components included in a power source while also minimizing or eliminating the weight and cost of manufacturing a power source are desired.

SUMMARY

The present disclosure is directed towards an apparatus and configuration for cooling a power source, as well as a method of cooling a power source. More particularly, the present disclosure is directed toward an apparatus and configuration for cooling electronic components in a power source, as well as a method of cooling electronic components in a power source.

According to one embodiment, the present disclosure is directed towards an electromagnetic component assembly disposed in a power source of a welding or cutting system. The electromagnetic component assembly includes a core and a tubular winding placed near or around the core. The tubular winding conducts a current for an electromagnetic operation. The tubular winding includes a passageway for a process fluid, an inlet at one end of the passageway which receives the process fluid, and an outlet at another end of the passageway that directs the process fluid downstream toward a torch assembly. The passageway enhances cooling of the electromagnetic component assembly as the process fluid travels through the passageway from the inlet to the outlet. The tubular winding includes an outside dielectric layer to prevent short circuit from turn to turn. This layer can be a sleeve of insulation or coating.

Advantageously, this tubular winding conducts a current for an electromagnetic operation and also cools the electromagnetic component assembly (winding) to suitable temperatures with the process fluid without requiring cooling-specific components (e.g., components dedicated to cooling and not involved in operational undertakings of the power source, such as transferring power or process gas) and without requiring cooling-specific fluids (e.g., gas or liquids dedicated to cooling and is not a process gas used for the cutting or welding operation). Thus, power sources including the electromagnetic component assembly with the tubular winding may be lighter and/or cheaper than power sources with cooling-specific components, such as fans or liquid flow paths. Alternatively, the electromagnetic component assembly may enhance the cooling provided by cooling-specific components without substantially increasing the weight and/or cost of a power source.

In some of these embodiments, the process fluid is plasma gas and the torch assembly is a plasma arc torch assembly. When the plasma gas reaches the plasma arc torch assembly, the plasma gas is ionized to create a plasma stream. In some of these embodiments, the process fluid is a processing gas or a processing water mist. Additionally or alternatively, the process gas may be the only media (e.g., gas, liquid, etc.)

flowing through the passageway. Moreover, in some of these embodiments, the process fluid is provided from a heat sink of the power source to the inlet.

In some embodiments, the tubular winding is a copper tubular winding. Additionally or alternatively, the core and the tubular winding, together, form an inductor. In some of these inductor embodiments, the core includes an E-shaped core and an I-shaped core that faces a plurality of legs of the E-shaped core. The tubular winding is then wound in spaces formed between the plurality of legs of the E-shaped core. In such a configuration, the tubular winding is protected from external environmental factors such as dust because it is not exposed to ambient airflows. Further, reliability of an inductor is increased with fewer joints and less leak points. Also, fabrication is simpler because fewer parts are used in comparison to using two E-shaped cores, for example.

In some embodiments, the electromagnetic component assembly may include a coil-winding wound around the core and conducting the current for the electromagnetic operation. For example, the coil winding may be a primary winding of a transformer. In some of these transformer-related embodiments, the passageway may include a first conduit having the inlet and forming a secondary winding for the transformer, a second conduit having the outlet and forming another winding for an inductor, and a common conduit connecting the first conduit and the second conduit. Alternatively, the tubular winding forms a secondary winding of the transformer and the electromagnetic component assembly may further include another core downstream of the outlet, another tubular winding being placed near the another core and forming an inductor, and a shared conduit connecting the tubular winding to the another tubular winding. In this arrangement, the another tubular winding may include another passageway for the process fluid, another inlet, at a first end of the another passageway, that receives the process fluid from the shared conduit, and another outlet, at a second end of the another passageway, that directs the process fluid further downstream toward the torch assembly. Notably, the another passageway enhances cooling of the inductor as the process fluid travels through the another passageway from the another inlet to the another outlet.

In some embodiments, the electromagnetic component assembly may further include a conduit running through the core, a conduit inlet, at a first end of the conduit, that receives a cooling fluid, and a conduit outlet, at a second end of the conduit, that directs the cooling fluid out of the conduit. In this case, the conduit enhances cooling of the electromagnetic component assembly as the cooling fluid travels through the conduit from the conduit inlet to the conduit outlet. Notably, the conduit running through the core enhances cooling of the electromagnetic component.

According to yet another embodiment, the present disclosure is directed towards a power source for the welding or cutting system including an external housing and the electromagnetic component assembly such as the one described above and disposed in an internal cavity formed by the external housing.

In some of these embodiments, the power source may further include an inlet port, placed on a back wall of the external housing and receiving the process fluid from a fluid supply and at least one heat sink, being placed in the internal cavity near the electromagnetic component assembly, receiving the process fluid from the inlet port, and providing the process fluid to the inlet. Additionally or alternatively, the power source may further include an outlet port, being placed on a front wall of the external housing, receiving the process fluid from the outlet, and directing the process fluid toward the torch assembly.

According to yet another embodiment, the present disclosure is directed toward an electromagnetic component assembly disposed in a power source of a welding or cutting system, which includes a core, a coil winding being placed near or around the core and conducting a current for an electromagnetic operation, and a tubular passageway running through the core. The electromagnetic component assembly further includes an inlet, at one end of the tubular passageway that receives process fluid and an outlet, at another end of the tubular passageway that directs the process fluid downstream toward a torch assembly. Notably, the tubular passageway enhances cooling of the electromagnetic component assembly as the process fluid travels through the tubular passageway from the inlet to the outlet.

In some of these embodiments, the tubular passageway may be U-shaped. Additionally or alternatively, the inlet and the outlet are formed at a base of the core.

In some of these embodiments, the process fluid may be a processing gas or a processing water mist and is the only media flowing through the tubular passageway. The process fluid may be provided from a heat sink of the power source to the inlet. Further, the water mist is for the plasma process.

According to yet another embodiment, the present disclosure is directed towards a method of cooling an electromagnetic component assembly disposed in a power source for a welding or cutting system. The method includes placing a tubular winding near or around a core and conducting a current for an electromagnetic operation through the tubular winding. The method further includes forming a flow passage inside the tubular winding and directing process fluid through the flow passage as the process fluid flows towards a torch assembly.

In at least some embodiments, the process fluid is plasma gas, the torch assembly is a plasma arc torch assembly, and when the plasma gas reaches the plasma arc torch assembly, the plasma gas is ionized to create a plasma stream. In at least some embodiments, the directing occurs during welding or cutting operations of the welding or cutting system. This eliminates risks associated with detecting a rise in temperature and also conserves energy because electrical components do not experience a relatively extreme rise in temperature between cooling cycles. Instead, when the electrical components are generating heat (e.g., during operation of the power source), cooling is provided. Further, cooling is provided with the process fluid that is used for the welding or cutting operation. No separate cooling fluid is required.

BRIEF DESCRIPTION OF THE SEVERAL VIEWS OF THE DRAWINGS

FIG. 8 is a perspective view of an electromagnetic component assembly having a tubular passageway for a process fluid running through a core, according to yet another embodiment of the present disclosure.

Like numerals identify like components throughout the figures.

DETAILED DESCRIPTION

Figure 1:
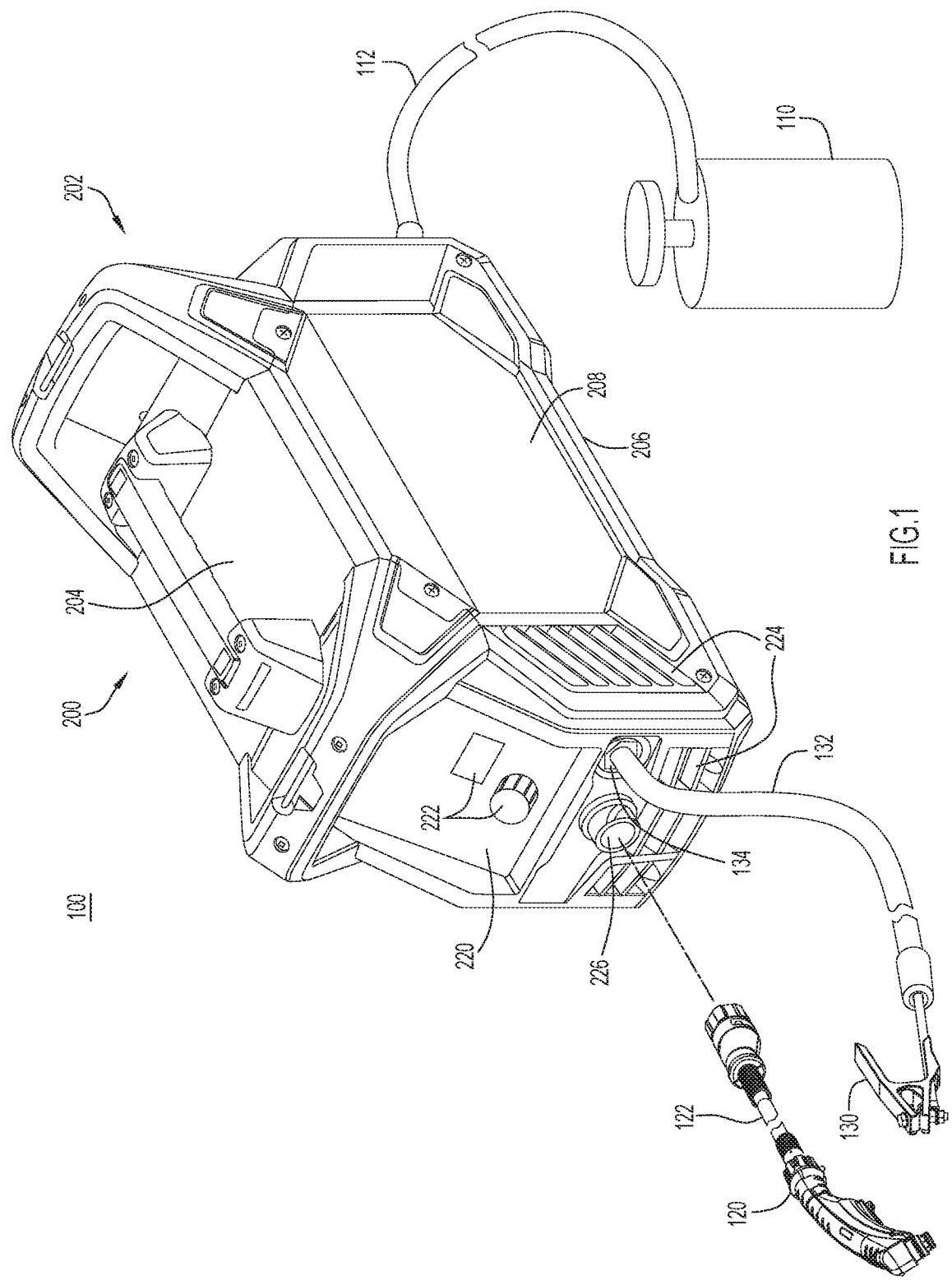
FIG. 1 is a perspective view of a welding and/or cutting system including a gas supply and a torch assembly that are connected to a power source including an electromagnetic component assembly formed in accordance with an embodiment of the present disclosure.

An apparatus, configuration, and method for an electromagnetic component assembly of a power source are presented herein.

The apparatus, configuration, and method direct process fluid (i.e., operational gas or liquid), such as plasma gas or water mist, through a passageway formed in a tubular winding and/or through a passageway formed in a core of an electromagnetic component assembly, disposed in a power source, to cool the electromagnetic component assembly. While below embodiments describe the electromagnetic component assembly with reference to a transformer and/or an inductor and/or a component having a winding and a core, the present disclosure is not limited thereto. The passageway may be formed in other electrical components (e.g., resistors, capacitors, integrated circuits, computing components (e.g., microprocessors), etc.) included in the power source. For example, coils in one or more of these other electrical components may be replaced with tubular windings that conduct current and provide a passageway for the process fluid to cool the respective electrical component. As another example, a holding component and/or a housing component of electrical components such as a core may be modified to form a passageway for the process fluid to cool the respective electrical component.

In various embodiments, the electromagnetic component assembly of the power source is typically used to deliver power for various operations and is modified to also pass the process fluid to a torch assembly, thereby using the process fluid to cool one or more of the electrical components therein. Consequently, the apparatus and configuration provide cooling without adding cooling-specific components to a power source. Moreover, the cooling provided by the process fluid provides efficient cooling and, thus, can replace or enhance cooling provided by other means. In fact, cooling-specific components, such as fans, can be removed from a power source and/or replaced with smaller and/or cheaper components. For example, a power source incorporating the passageway for the process fluid/configuration presented herein may not need a fan to force a flow of ambient air through the power source. Consequently, the cooling apparatus/configuration presented herein may reduce the cost, weight, and/or electrical consumption of a power source while still providing any electrical components included in the power source with sufficient cooling.

By comparison, liquid cooling and/or phase change cooling can only be implemented by adding (e.g., installing/including) cooling-specific components to a power source, insofar as cooling-specific components are dedicated to cooling and not directly involved in operational undertakings of the power source (e.g., transferring process fluid and electricity to a torch assembly). For example, liquid cooling requires a power source to include or define closed flow paths dedicated to passing a flow of liquid (e.g., water) through the power source exclusively for cooling. Meanwhile, a power source utilizing phase change cooling may require one or more heat pipes with an internal fluid that evaporates at a low temperature (to pull energy away from an electrical component) to be bonded to a heat sink or heat transfer surface with a specific gap filler or bonding agent (e.g., a bonding agent that increases the resistance of the thermal bonded joint and slows the conduction of heat from the heat sink/heat transfer surface to the heat pipe).

Since the apparatus and configuration presented herein utilize process fluid for cooling, the power source need not include components dedicated solely to cooling the power source (e.g., liquid flow paths, heat pipes, bonding agents, fans, radiators, pumps, reservoirs, hoses, etc.). That is, the power source utilizes components that already exist in nearly all power sources (e.g., electrical windings and/or magnetic cores) to generate effective cooling. Moreover, a power source including the electromagnetic component assembly/configuration presented herein need not pass a second media (e.g., gas, liquid, etc.) through the power source to provide cooling. Instead, a processing fluid used to perform the cutting and/or welding operations is also used to cool the respective electrical components.

FIG. 1 is a perspective view illustrating a welding and/or cutting system (hereinafter a cutting system 100) that includes a process fluid supply 110 and a torch assembly 120, which are connected to a power source 200 having an electromagnetic component assembly 201 (FIGS. 2 and 3) formed therein in accordance with an embodiment of the present disclosure.

At a high-level, the cutting system 100 includes the power source 200 that supplies power to the torch assembly 120 while also controlling the flow of process fluid from a process fluid supply 110 to the torch assembly 120 (however, in other embodiments, the power source 200 might supply the process fluid itself).

The process fluid supply 110 is connected to the power source 200 via a cable hose 112 and the power source 200 is connected to the torch assembly 120 via a cable hose 122. The cutting system 100 also includes a working lead formed of a cable hose 132 and a grounding clamp 130. As is illustrated, the cable hose 112, the cable hose 122, and/or the cable hose 132 may each be any length. In order to connect the aforementioned components, the opposing ends of cable hose 112, cable hose 122, and/or cable hose 132 may each be coupled to the power source 200, the torch assembly 120, the process fluid supply 110, or the grounding clamp 130 in any manner now known or developed hereafter (e.g., a releasable connection).

Figure 2:
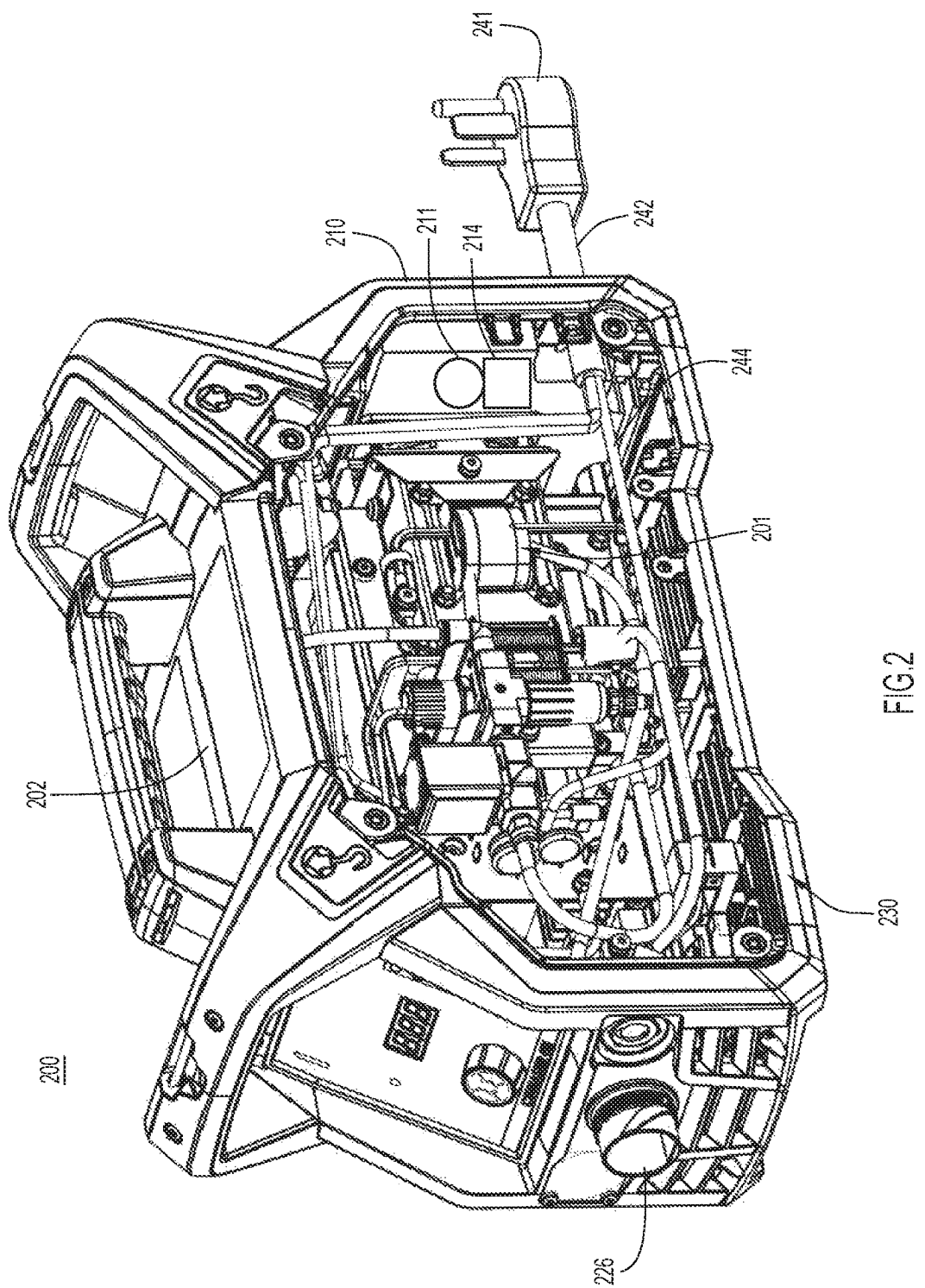
FIG. 2 is a side perspective view of the power source of FIG. 1 with one side of an external housing of the power source removed.

The power source 200 includes an exterior housing 202. That is, a top cover 204, a bottom 206, a first side 208, a back 210 (FIG. 2), a second side 212 (FIG. 3), and a front 220 cooperate with each other to form the exterior housing 202 that defines an interior cavity 230 (FIG. 2). The front 220 may include a control panel 222 with one or more knobs and/or a display but is not limited thereto. The front 220, the first side 208, and/or the second side 212 may include ventilation vents 224 to provide for circulation of ambient air but is not limited thereto. In alternative embodiments, the ventilation vents 224 are provided on the back 210 and/or the top cover 204 or are omitted altogether.

Figure 3:
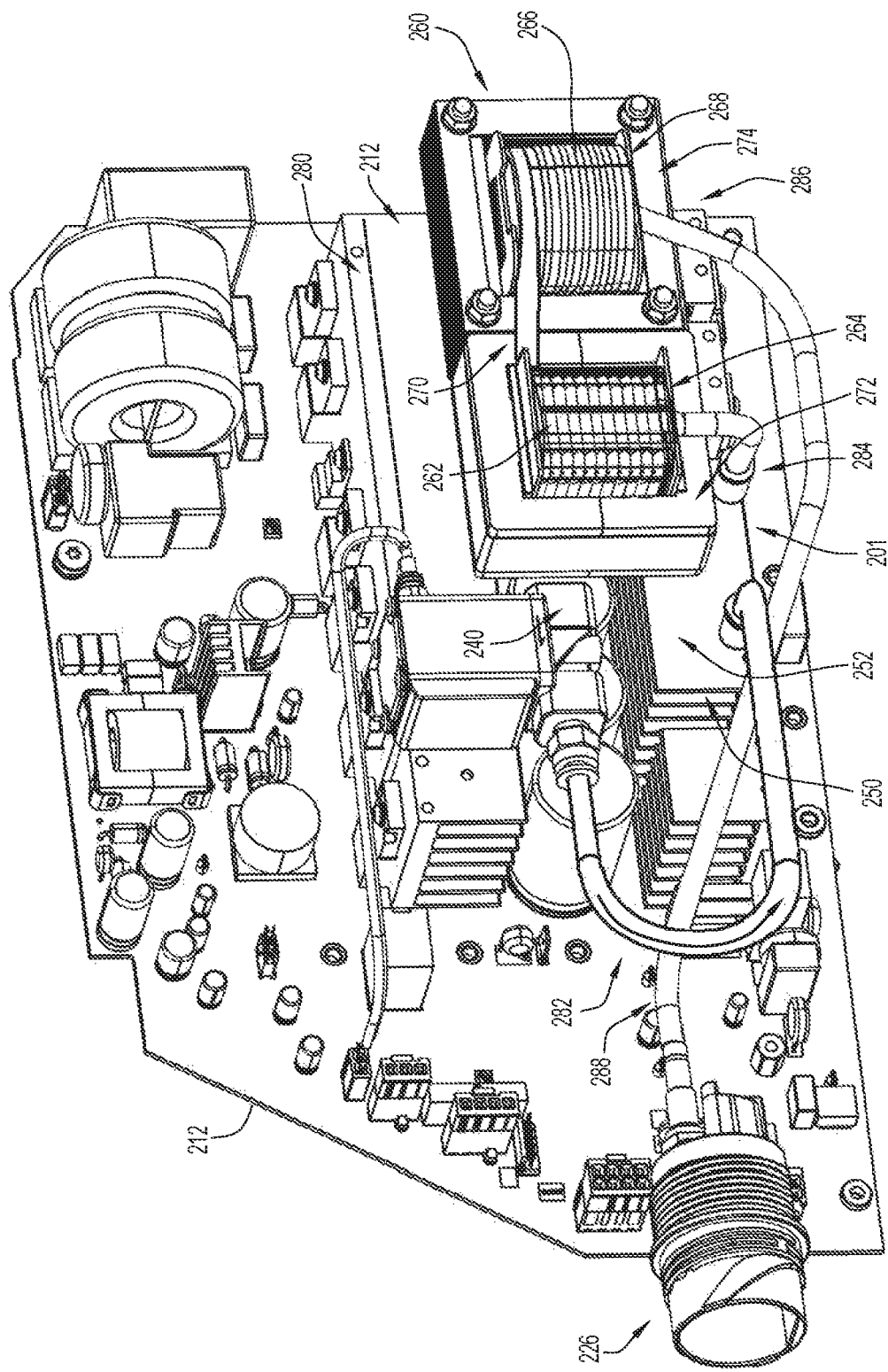
FIG. 3 is a side view of the power source of FIG. 1 with a back panel and some of its internal components removed.

Still referring to FIG. 1, but now together with FIGS. 2 and 3, generally, in the depicted embodiment, the electromagnetic component assembly 201 utilizes compressed process fluid from the process fluid supply 110 to cool various electrical components in the power source 200 as the compressed process fluid flows through the electromagnetic component assembly 201, from the process fluid supply 110 to the torch assembly 120.

Specifically, first, the compressed process fluid flows from the process fluid supply 110 to the power source 200 via the cable hose 112. Second, the compressed process fluid enters the power source 200 via a process fluid inlet port 211 (FIG. 2). The process fluid inlet port 211 is located on the back 210 of the power source 200. The flow rate of the compressed process fluid may be controlled and/or regulated at the process fluid inlet port 211 by a flow controller 214 (e.g., a solenoid valve assembly). Third, the compressed process fluid flows through the power source 200, as detailed below with reference to FIG. 3, and fourth, the compressed process fluid is supplied to the torch assembly 120 via a process fluid outlet port 226.

In FIG. 2, the interior cavity 230 houses various components of the power source 200 and includes electrical components that in a given example are depicted as the electromagnetic component assembly 201. The power source 200 utilizes power from a power supply (not shown) to power various electrical components such as the electromagnetic component assembly 201 in the power source 200. A power plug 241 extends outside the power source 200 from the back 210 and mates with a power socket (not shown) to obtain current and/or voltage from a power supply and supply current and/or voltage (power) to the power source 200 via an external cord 242. The external cord 242 is then electrically connected to one or more internal cords or wires 244 that supply power to the electromagnetic component assembly 201 for various operations and/or supply power to the torch assembly 120 for welding and/or cutting operations. This is just an example and various ways now known or later developed to supply power to the power source 200 are within the scope of the present disclosure.

In FIG. 3, the electromagnetic component assembly 201 may include a printer circuit board (PCB) 240 that extends perpendicularly upwards from the bottom 206 (e.g., parallel to the first side 208 and the second side 212 of the power source 200). Various electrical components 260 are mounted directly or indirectly to the PCB 240 and are electrically connected directly or indirectly to the PCB 240. The electrical components 260 are operative to control supply of electricity and/or process fluid to the torch assembly 120 based on commands/signals received by the power source 200 (e.g., commands received at the control panel 222).

In the depicted embodiment, the electrical components 260 include, but are not limited to, a first winding 262 wound around a first bobbin 264 and a second winding 266 wound around a second bobbin 268. The first winding 262 and the second winding 266 are connected via a center tap 270. The first winding 262 is housed inside a first core 272 and the second winding 266 is housed inside a second core 274. Alternatively, the first winding 262 and the second winding 266 may be housed in one single core. Further, the first winding 262 and the second winding 266 may be wound around the first core 272 and the second core 274. The above are just some examples of forming electrical components 260 of the power source 200 and many other configurations of the electrical components 260 currently known or later developed are within the scope of the present disclosure. Additionally, sizes and/or shapes and/or other attributes (e.g., lengths, thickness, etc.) of various windings and cores depend on a particular use case of the electrical components 260.

In the depicted embodiment, the first winding 262, the center tap 270, and the second winding 266 (collectively referred to as "windings") are electrically hot because of a current flowing therein. The windings should be at a temperature below 225° C. and preferably below 180° C. Accordingly, one or more sensors (not shown) may be provided outside and/or inside the first core 272 and the second core 274 to monitor current and/or voltage flowing through the windings but the present disclosure is not limited thereto. The windings should be covered in one or more insulating materials to avoid the transfer of heat to other components in the power source 200, but is not limited thereto. That is, the windings include an outside dielectric layer to prevent short circuit from turn to turn. This layer can be a sleeve of insulation or a coating. Additionally, in order to direct the heat generated by the windings out of the power source 200, heat sinks 250 are usually provided near the electromagnetic component assembly 201.

In other words, various techniques and components are used to cool the electromagnetic component assembly 201 and avoid the rise of temperature above an acceptable threshold. In various example embodiments, the compressed process fluid, dedicated to welding and/or cutting operations are now also used to cool the electromagnetic component assembly 201 during operations of the cutting system 100. In particular, the compressed process fluid enters the power source 200 via the process fluid inlet port 211 provided on the back 210 (FIG. 2) into an internal closed flow path 280. The process fluid then flows through a first internal pipe 282 and into a first heat sink 252 from among the heat sinks 250. Next, the process fluid flows through one or more of the heats sinks 250 and exits at the same first heat sink 252 to flow into the electromagnetic component assembly 201, as detailed below.

In one embodiment, at least a portion of the first winding 262 and/or at least a portion of the second winding 266, and/or the center tap 270, may be a copper tube or a conductive conduit that forms a passageway for the process fluid. The process fluid enters the first winding 262 via an inlet port 284, flows through the first winding 262 thereby cooling it, and into the second winding 266 via the center tap 270. Then, the process fluid exits the electromagnetic component assembly 201 via an outlet port 286 and is supplied to the process fluid outlet port 226 on the front 220 of the power source 200 via a second internal pipe 288. When the compressed process fluid reaches the process fluid outlet port 226, the compressed process fluid is directed to the torch assembly 120. Notably, for the purposes of this description, the process fluid outlet port 226 is largely described with respect to fluid transfer of a single fluid or the processing fluid; however, it is to be understood that the process fluid outlet port 226 may also allow the power source 200 to transfer additional process gasses and/or process fluids and/or electricity to the torch assembly 120. By comparison, the front 220 also includes an additional port 134 (FIG. 1) for the cable hose 132 that connects the working clamp 130 to the power source 200 and, typically, the port only provides an electrical connection and is unrelated to process fluid flow.

In the depicted embodiment, the coil conducting wires of one or more windings are replaced with a conductive tube or conduit that still conducts the power required for the electric operations but also forms a passageway for the process fluid to cool the electromagnetic component assembly 201.

In FIG. 3, the electrical components 260 may include a transformer that transforms high voltage-low amperage current received on a primary side (the first winding 262) to a low voltage-high amperage current on a secondary side (the second winding 266), which is more desirable for cutting and/or welding operations. The electrical components 260 may also include an inductor to control the supply of electricity (avoid short-circuiting, etc.). The inductor helps control the current so that a steady and/or stable supply of electricity is provided within the power source 200 and/or to the torch assembly 120.

Figure 4:
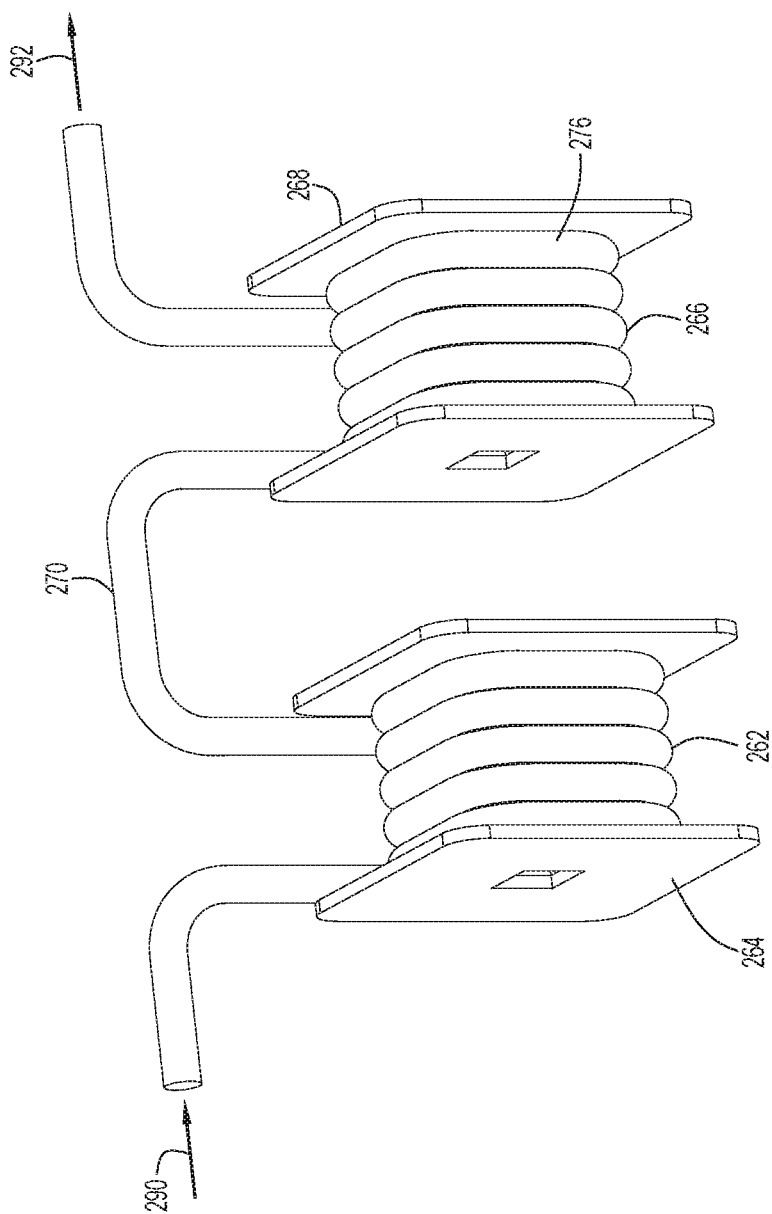
FIG. 4 is an exploded simplified diagram of an electromagnetic component assembly of the electromagnetic component assembly of FIG. 3 in accordance with an embodiment of the present disclosure.

FIG. 4 is an exploded simplified diagram of the electrical components 260 shown in FIG. 3. The first winding 262 may be formed of coil or wire and is wound around the first bobbin 264 and/or a first core (when the winding are wound around the core). The first winding 262 forms a primary winding of the transformer. The center tap 270 connects the first winding 262 to the second winding 266 wound on the second bobbin 268. The second winding 266 is formed of a conductive tube or conduit and is a secondary winding of the transformer. Additionally, a third winding 276 may also be wound around the second bobbin 268 and/or a second core (when the windings are wound around the core). The third winding 276 forms an inductor that controls and/or regulates the supply of electricity to the plasma torch (torch assembly 120). The third winding 276 is also formed of a conductive tube or conduit. At a passageway inlet 290, the process fluid may flow into the center tap 270 and through the conductive tube formed by the second winding 266 and the third winding 276. That is, the center tap 270, the second winding 266, and the third winding 276, together, form a passageway for the process fluid. The process fluid exits the passageway at the passageway outlet 292 and is then supplied to the torch assembly 120. Optionally, the first winding 262 may also be formed of a conductive tube or conduit and in this configuration, the process fluid enters the passageway inlet 290 and respectively flows through the first winding 262, the center tap 270, the second winding 266, and the third winding 276. In other words, the first winding 262, the center tap 270, the second winding 266, and the third winding 276, together form the passageway. In yet another embodiment, the passageway may be formed by the first winding 262 and/or the center tap 270, the second winding 266, and/or the third winding 276.

Figure 5:
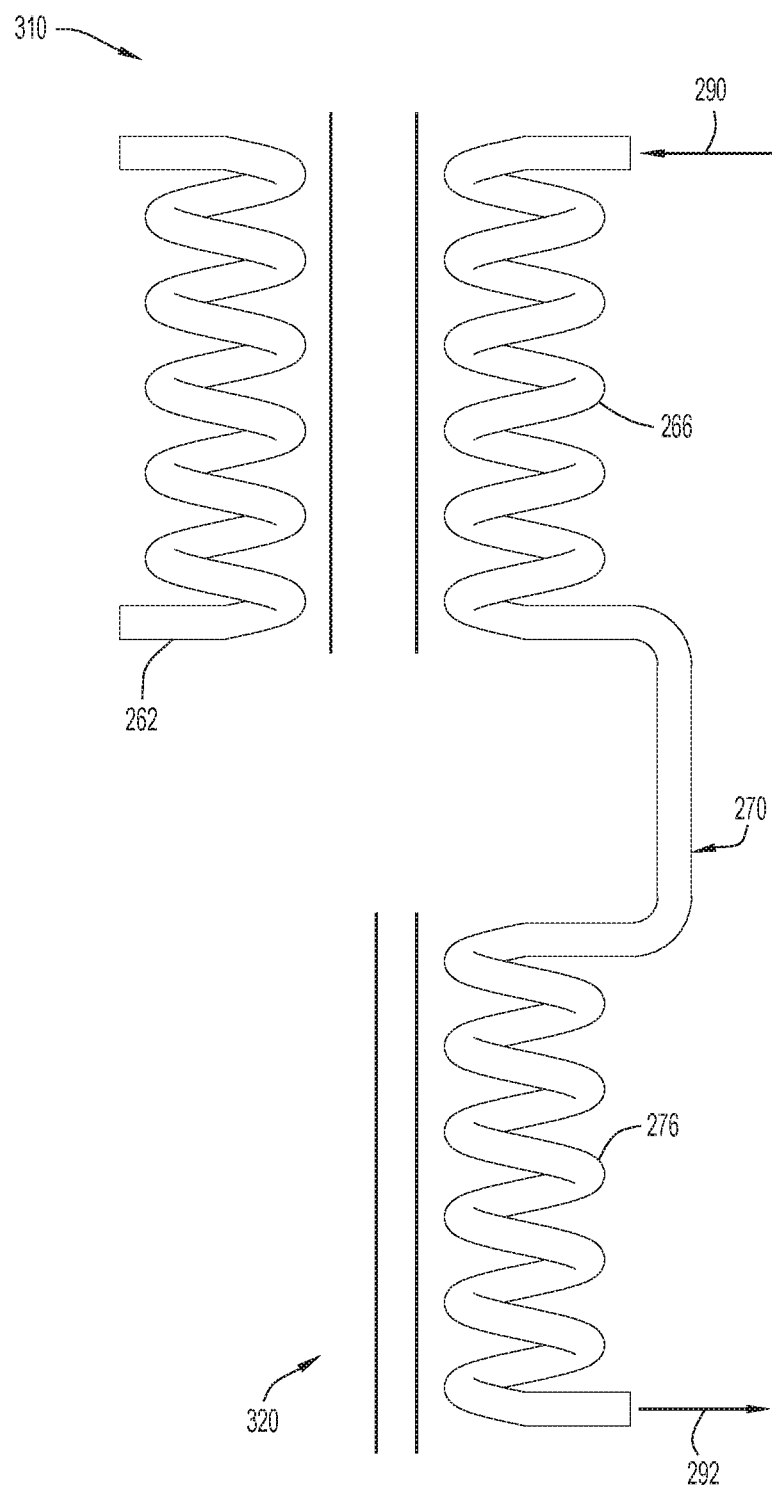
FIG. 5 is a simplified electrical diagram of an electromagnetic component assembly shown in FIGS. 3 and 4 in accordance with an embodiment of the present disclosure.

Turning now to FIG. 5, an electrical diagram of the electrical components 260 shown in FIGS. 3 and 4 is provided. The electrical components 260 include a transformer 310 and an inductor 320. The transformer 310 has the first winding 262 (primary coil winding) and the second winding 266 (secondary conductive conduit or tubular winding). The second winding 266 is connected to the third winding 276 (conductive conduit or tubular winding) of the inductor 320 via the center tap 270 (a common tube). By way of an example, a copper tube is used (in place of a copper wire) to form the secondary coil of the transformer 310 and/or the coil of the inductor 320. A passageway may be formed by a single conductive tube that spans the secondary winding of the transformer 310 (the second winding 266) and the winding of the inductor 320 (the third winding 276). The primary coil (the first winding 262) of the transformer 310 may remain unchanged (a wire or coil). The process fluid (e.g., plasma gas that will eventually be used to create plasma) enters the passageway inlet 290, flows through the tube or the passageway to cool both the transformer 310 and the inductor 320, and exits at the passageway outlet 292. In such a setup, tubular winding(s) reduce the number of electrical connections needed in the power supply, decrease the number of parts included in the power supply, and improve cooling for the electromagnetic component assembly 201. This is but an example configuration of the electrical components 260 and the present disclosure is not limited thereto.

In the depicted embodiment, the compressed process fluid may be plasma gas and, thus, once the compressed plasma gas reaches the torch assembly 120, the compressed plasma gas is directed through an arc in the torch assembly 120 to generate a stream of plasma. However, in other embodiments, the electromagnetic component assembly 201 presented herein might also be used in welding systems, automated cutting systems, and/or any other system in which electrical components 260 require cooling and operational or process fluid is flowing from the power source 200 to the torch assembly 120. That is, the apparatus and configuration presented herein may be useful in power sources suitable for various types of welding or cutting. In these other embodiments, the process fluid might be any gas utilized during welding or cutting operations and need not necessarily be compressed gas. For example, in some embodiments, the process fluid might be shielding gas or water mist. That being said, using a compressed process gas also takes advantage of the throttling effect of compressed gasses expanding and cooling. This creates a larger temperature differential between the cooler compressed gas and the higher temperature of heated surfaces which will drive higher convection cooling. However, regardless of the type of process fluid used, the process fluid is the only media that travels through the formed passageway; no water, other liquids, or other gasses pass there through and no dedicated coolants are needed.

In various embodiments, the power source 200 does not include a fan and the process fluid cooling explained above replaces cooling provided by forced subsonic airflow created by the fan. However, in other embodiments, the process fluid cooling may be in addition to a forced subsonic airflow system and, in these embodiments, the power source 200 might include one or more fans in the interior cavity 230 (FIG. 2).

Figure 6:
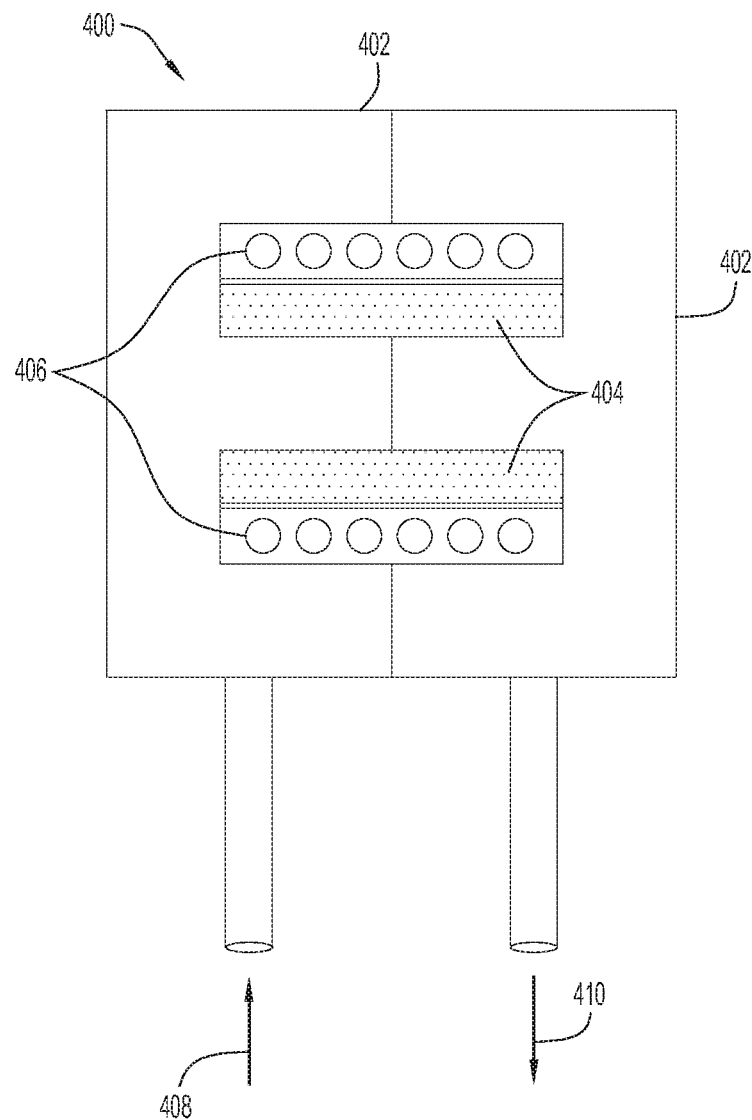
FIG. 6 is a perspective view of an electromagnetic component assembly having E-shaped cores in accordance with another embodiment of the present disclosure.
Figure 7A:
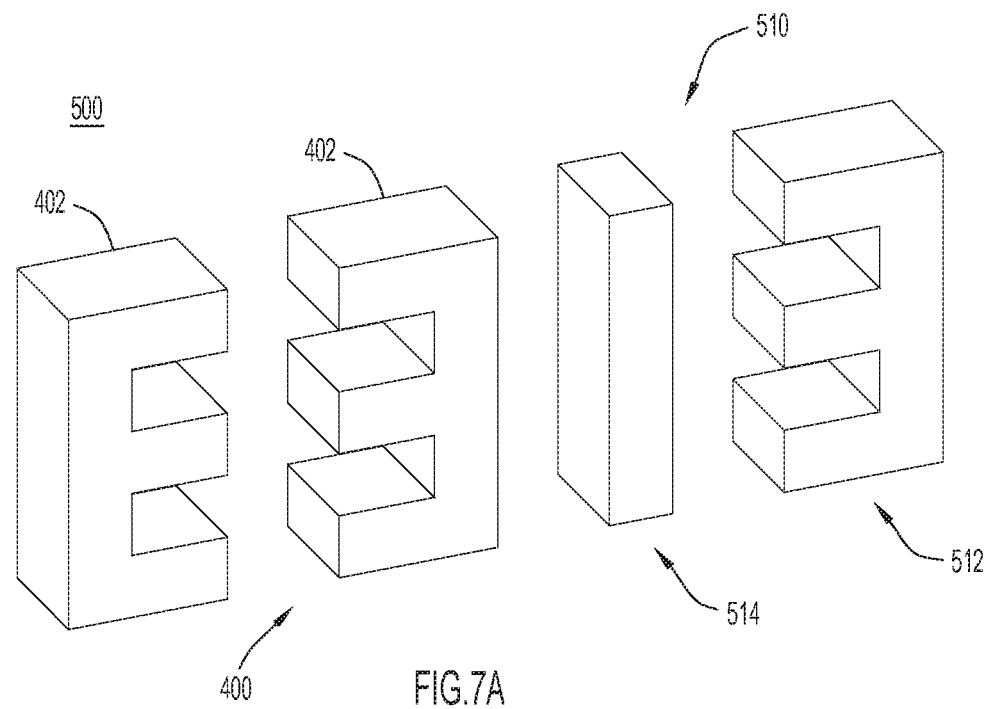
FIGS. 7A and 7B are perspective views of an electromagnetic component assembly having E-shaped cores and an I-shaped core, according to yet another embodiment of the present disclosure.
Figure 7B:
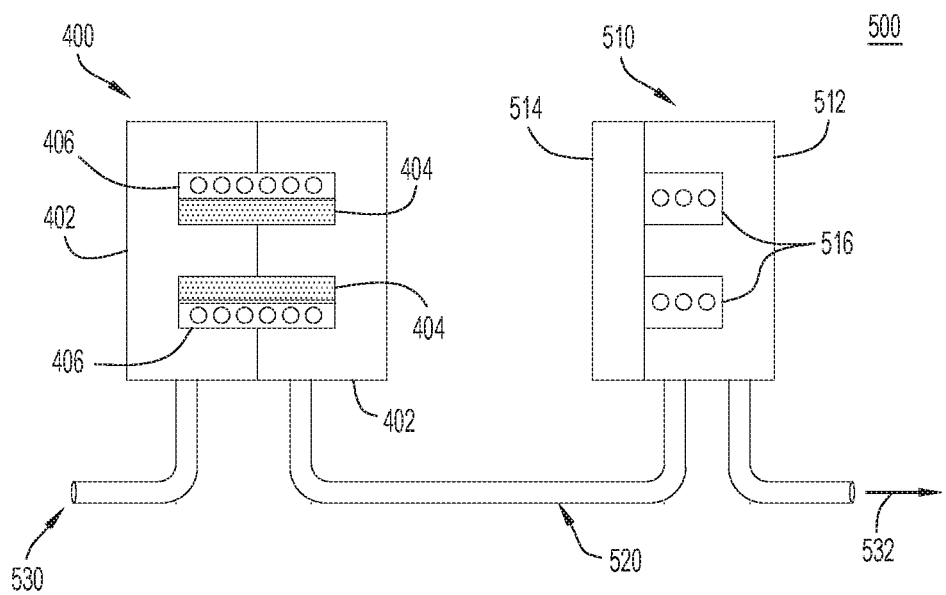

Now turning to FIGS. 6-7B, generally, these figures illustrate various electromagnetic component assemblies that are suitable for the cooling presented herein. In FIG. 6, the transformer 400 has two E-shaped cores 402 that face each other with the windings wound in spaces between the legs of the E-shaped cores 402. In particular, the primary winding 404 is a coil wire (depicted by dots) and the secondary winding 406 is a conductive conduit (depicted by circles). The process fluid enters the transformer 400 via a transformer inlet port 408, flows through a passageway formed by the secondary winding 406, and exits the transformer 400 via a transformer outlet port 410. The passageway defined by the secondary winding 406 transfers heat away (e.g., from the electrical component) or cools the primary winding 404 and/or the secondary winding 406 (e.g., the electrical components) by having the process fluid flow therein. The transformer inlet port 408 and the transformer outlet port 410 may both be disposed in a vicinity or proximate to the bottom 206 but are not limited thereto; other configurations are within the scope of the present disclosure.

In FIGS. 7A and 7B, the electromagnetic component assembly 500 includes the transformer 400 with two E-shaped cores 402 and an inductor 510 having an E-shaped core 512 and an I-shaped core 514. As shown in FIG. 7A, the two E-shaped cores 402 of the transformer 400 face each other and form a housing for both the primary winding 404 and the secondary winding 406. The two E-shaped cores 402 completely cover and/or surround the primary winding 404 and the secondary winding 406, thus providing protection from external elements (e.g., dust) and thus providing a sturdier and more reliable configuration (e.g. prevent leaks, fewer joints, etc.). An E-shaped core 512 and an I-shaped core 514 of the inductor 510 form a housing for an inductor winding 516. The E-shaped core 512 and the I-shaped core 514, when placed together (FIG. 7B), completely cover and/or surround the inductor winding 516. Accordingly, the inductor winding 516 is protected from external elements (e.g., dust) and has a sturdier and more reliable construction. Additionally, the manufacturing of the core is easier because it provides a simpler structure than an E-shaped core and is less costly as it requires less materials than an E-shaped core, for example. In FIG. 7B, the primary winding 404 is a coil wire(s) and the secondary winding 406 is a copper tube that conducts electricity and form a passageway for the process fluid. A shared tube 520 (e.g. copper conduit) connects the secondary winding 406 with the inductor winding 516. The shared tube 520 may form a part of the passageway for the process fluid.

In the depicted embodiment, the process fluid is directed into the electromagnetic component assembly 500 at an input inlet 530, flows through the secondary winding 406 of the transformer 400 and into the inductor 510 via the shared tube 520. The process fluid then flows through the inductor 510 (the inductor winding 516) and is directed out of the electromagnetic component assembly 500 at an output outlet 532.

The above are just few embodiments, a number of variations are within the scope of the present disclosure. For example, one of the windings, multiple windings, and/or parts thereof may be replaced with a conductive tube and form a passageway for the process fluid. Further, the passageway may be formed by a number of sub-passageways (e.g., have forks or split into parallel sub-passageways).

Further, the windings are not the only components through which the process fluid may be directed to cool electrical components of the power source 200. FIG. 8 is a perspective view illustrating an electromagnetic component assembly 600 in which the windings 602 are coil windings and a non-conductive tubular conduit 604 for the process fluid is provided through the core 606. The process fluid is directed into the electromagnetic component assembly 600 at a core inlet port 608 disposed at a bottom of one side of the core 606 and is directed out of the electromagnetic component assembly 600 at a core outlet port 610 disposed at the bottom of the other side of the core 606. The tubular conduit 604 does not conduct electricity and is dedicated to directing the process fluid through the core 606 for the cooling. The tubular conduit 604 forms an upside down U-shape, as shown in FIG. 8, to enhance the cooling of the windings 602. This is just one embodiment and other shapes and configurations of the tubular conduit 604 being provided through the core 606 are within the scope of the present disclosure. For example, the tubular conduit 604 may form an I shape, a C shape, or V shape, or etc. Further, the tubular conduit 604 might be split into a number of sub-conduits. In addition to the process fluid flowing through the tubular conduit 604, the process fluid may also flow through one or more of the windings 602. According to yet another variation, the tubular conduit 604 may connect to the windings 602 (tubular conduit) to form one passageway for enhanced cooling using the process fluid.

According to yet another embodiment, the tubular conduit 604 may provide a first passageway for a coolant fluid and the windings 602 may be formed of a tubular conduit to provide a second passageway for the process fluid. The cooling is then enhanced by having the coolant fluid flow through the first passageway and having the process fluid flow through the second passageway, thereby enhancing cooling of the electromagnetic component assembly 600.

Referring generally to FIGS. 1-8, in some embodiments, the electromagnetic component assembly may include a flow controller (not shown) dedicated to the assembly to control the amount of process fluid flowing into the inlet port 284. The flow controller may control the flow of process fluid into the passageway (from the first internal pipe 282) and may determine what portion or percentage of that flow of process fluid to divert to another passageway. That is, the passageway in the electromagnetic component assembly may have a split or fork (as explained above) and the flow controller may control an amount of process fluid that flows down a first pathway of the split (and into/onto a tubular conduit of a winding and/or core) and the process fluid not flowing down the first pathway may flow down a second pathway. The process fluid flowing along the second pathway may flow through another tubular conduit of another winding and/or core or may be diverted to another electromagnetic component assembly or another electrical component of the power source 200. For example, one portion of the process fluid may be directed into the heat sinks 250 and another portion of the process fluid may be directed into the windings and/or core. As another example, one portion of the process fluid may be directed to a first electromagnetic component and another portion of the process fluid may be directed to a second electromagnetic component, thereby cooling both of the electromagnetic components at substantially same time.

Additionally or alternatively, in some embodiments, any electrical component with a passageway may include a dedicated flow controller so that the flow of process fluid through that component can be controlled, for example, to provide additional or decreased cooling to one particular electrical component as compared to other electrical components. The flow of process fluid may be controlled based on detected temperature received from a temperature sensor dedicated to that component. That is, when the detected temperature of that component exceeds a first threshold, the controller may direct 30% of the process fluid through the component. On the other hand, when the detected temperature rises to a second threshold (greater than the first threshold), the controller may direct 60% of the process fluid through the component. In other words, the controller may be pre-configured to change amount or portion of the process fluid to direct through the component based on the sensed temperature and a pre-configuration table that correlates temperature to an amount/portion of the process fluid (e.g. when sensed temperature exceeds 125° C., open valve 50% so that ½ of the process fluid flows through the component and when the sensed temperature exceeds 150° C., open valve 100% so that all of the process fluid flows through the component because it is overheating).

Figure 9:
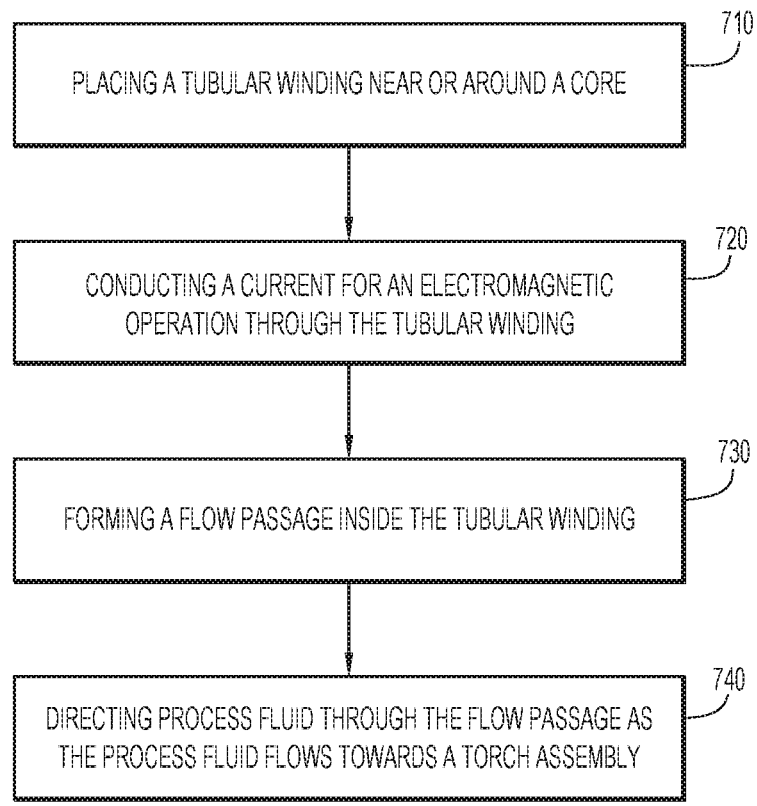
FIG. 9 is a high-level flow chart depicting a method of cooling an electromagnetic component assembly in accordance with the techniques presented herein.

Now turning to FIG. 9, a high-level flow chart is provided depicting a method 700 for cooling an electromagnetic component assembly of a power source in accordance with the techniques presented herein. Initially, at 710, a tubular winding is placed near or around a core. For example, the tubular winding may be wound around the core. Alternatively, the tubular winding may be placed in at least one space formed by the core such that the core forms a housing for the tubular winding. The tubular winding may be a primary winding of one or more electrical components and/or a secondary winding of these electrical components, as shown in FIGS. 3-7B. At 720, a current and/or voltage is conducted for an electromagnetic operation through the tubular winding. In other words, the tubular winding may be a copper tube or another conductive conduit that conducts electricity there through for an electromagnetic operation and/or to provide power to the torch assembly 120, as shown in FIG. 2. At 730, a flow passage is formed inside the tubular winding, as shown in FIGS. 3-7B and at 740, the process fluid is directed through the flow passage as the process fluid flows towards a torch assembly, thereby cooling the electromagnetic component assembly.

An alternative method may include placing the tubular conduit through a core, conducting a current for an electromagnetic operation through a coil-winding wound around or placed in spaces formed by the core. In this method, the tubular conduit forms a flow passage through the core to cool the coil winding as the process fluid flows through the formed flow passage toward the torch assembly.

To summarize, in one form an electromagnetic component assembly of a power source for a welding or cutting system is provided and is suitable for cooling one or more electrical components disposed within the assembly. The assembly includes a core and a tubular winding placed in one or more space formed by the core or wound around the core. The tubular winding conducts a current for an electromagnetic operation and cools the assembly by having an inlet, an outlet, and a passageway between the two. The inlet receives the process fluid and the outlet directs the process fluid toward the torch assembly. The process fluid flows through the passageway from the inlet to the outlet cooling or enhancing cooling of the assembly.

In another form, a power source for a welding or cutting system is presented herein, the power source includes an external housing and the electrical components noted above that is placed in an internal cavity formed by the external housing.

In yet another form, an electromagnetic component assembly disposed in a power source of a welding or cutting system is provided which includes a core, a coil winding, and a tubular passageway. The coil winding is wound around the core or is placed in one or more spaces formed by the core. The coil winding conducts a current for an electromagnetic operation. The tubular passageway runs through the core and has an inlet at one end in order to receive process fluid and an outlet at the other end in order to direct the process fluid out of the tubular passageway and downstream toward the torch assembly. The tubular passageway cools or enhances cooling of the electromagnetic component assembly as the processing fluid travels through the passageway from the inlet to the outlet.

In yet another form, a method of cooling an electromagnetic component assembly disposed in a power source for a welding or cutting system, is presented herein. The method includes placing a tubular winding near or around a core, conducting a current for an electromagnetic operation through the tubular winding, forming a flow passage inside the tubular winding, and directing process fluid through the flow passage as the process fluid flows towards a torch assembly.

Although the techniques are illustrated and described herein as embodied in one or more specific examples, the specific details of the examples are not intended to limit the scope of the techniques presented herein, since various modifications and structural changes may be made within the scope and range of the invention. For example, a power source including an electromagnetic component assembly formed in accordance with the techniques presented herein may include any number of closed flow paths extending from an inlet to an outlet of an electromagnetic component assembly and/or of a power source. As another example, a flow path may include any number of branches so that any number of components incorporated into the flow path in series or in parallel. In addition, various features from one of the examples discussed herein may be incorporated into any other examples. Accordingly, the appended claims should be construed broadly and in a manner consistent with the scope of the present disclosure.

I claim:

1. An electromagnetic component assembly disposed in a power source of a welding or cutting system, the electromagnetic component assembly comprising:
   a first core and a second core;
   a first tubular winding being placed between a first pair of parallel plates of the first core;
   a second tubular winding being placed between a second pair of the parallel plates of the second core, wherein the second pair of the parallel plates is dedicated to the second tubular winding and does not include the first tubular winding and at least one of the second pair of the parallel plates includes a center opening; and
   a center tap that includes a tube connecting the first tubular winding to the second tubular winding,
   wherein the first tubular winding and the second tubular winding conduct a current for an electromagnetic operation and comprise:
      a passageway for a process fluid,
      an inlet, at one end of the passageway, receiving the process fluid, and
      an outlet, at another end of the passageway, directing the process fluid downstream toward a torch assembly, wherein the passageway enhances cooling of the electromagnetic component assembly as the process fluid travels through the passageway from the inlet to the outlet.

2. The electromagnetic component assembly of claim 1, wherein the process fluid is plasma gas and the torch assembly is a plasma arc torch assembly, and wherein, when the plasma gas reaches the plasma arc torch assembly, the plasma gas is ionized to create a plasma stream.

3. The electromagnetic component assembly of claim 1, wherein the process fluid is a processing gas or a processing water mist and is the only media flowing through the passageway and wherein the process fluid is provided from a heat sink of the power source to the inlet.

4. The electromagnetic component assembly of claim 1, wherein at least one of the first tubular winding and the second tubular winding is a copper tubular winding.

5. The electromagnetic component assembly of claim 1, wherein the first core, the second core, the first tubular winding, and the second tubular winding form an inductor.

6. The electromagnetic component assembly of claim 5, wherein the first core and the second core comprise an E-shaped core and an I-shaped core that faces a plurality of legs of the E-shaped core and wherein at least the first tubular winding is wound in spaces formed between the plurality of legs of the E-shaped core.

7. The electromagnetic component assembly of claim 1, further comprising:

a coil winding being placed near at least one of the first core and the second core and conducting the current for the electromagnetic operation, wherein the coil winding is a primary winding of a transformer.

8. The electromagnetic component assembly of claim 7, wherein the passageway comprises:
the first tubular winding, which is a first conduit having the inlet and forming a secondary winding for the transformer;
the second tubular winding, which is a second conduit having the outlet and forming another winding for an inductor; and
the center tap, which is a common conduit connecting the first conduit and the second conduit.

9. The electromagnetic component assembly of claim 7, wherein the first tubular winding forms a secondary winding of the transformer being placed near the first core, the second tubular winding being placed near the second core and forming an inductor, and
wherein the second tubular winding comprises:
another inlet that receives the process fluid from the center tap, and that enhances the cooling of the inductor as the process fluid travels through the passageway from the another inlet to the outlet.

10. The electromagnetic component assembly of claim 1, further comprising:
a conduit running through the first core and the second core;
a conduit inlet, at a first end of the conduit, that receives a cooling fluid; and
a conduit outlet, at a second end of the conduit, that directs the cooling fluid out of the conduit, wherein the conduit enhances the cooling of the electromagnetic component assembly as the cooling fluid travels through the conduit from the conduit inlet to the conduit outlet.

11. The electromagnetic component assembly of claim 1, wherein the first tubular winding forms a primary winding and is wound around the first core and the second tubular winding forms a conductive tube and is wound around the second core.

12. A power source for the welding or cutting system, comprising:
an external housing; and
the electromagnetic component assembly of claim 1, which is disposed in an internal cavity formed by the external housing.

13. The power source of claim 12, further comprising:
an inlet port being placed on a wall of the external housing and receiving the process fluid from a fluid supply; and
at least one heat sink being placed in the internal cavity near the electromagnetic component assembly, receiving the process fluid from the inlet port, and providing the process fluid to the inlet.

14. The power source of claim 12, further comprising:
an outlet port being placed on a wall of the external housing, receiving the process fluid from the outlet, and directing the process fluid toward the torch assembly.

15. An electromagnetic component assembly disposed in a power source of a welding or cutting system, the electromagnetic component assembly comprising:
a first core and a second core;
a first coil winding being placed near or around the first core between a first pair of parallel plates of the first core and a second coil winding being placed near or around the second core between a second pair of the parallel plates of the second core, and the first coil winding and the second coil winding conducting a current for an electromagnetic operation, wherein the second pair of the parallel plates is dedicated to the second coil winding and does not include the first coil winding and at least one of the second pair of the parallel plates includes a center opening;
a tubular passageway running through the first core and the second core;
an inlet, at one end of the tubular passageway, receiving a process fluid; and
an outlet, at another end of the tubular passageway, directing the process fluid downstream toward a torch assembly, wherein the tubular passageway enhances cooling of the electromagnetic component assembly as the process fluid travels through the tubular passageway from the inlet to the outlet.

16. The electromagnetic component assembly of claim 15, wherein the tubular passageway does not conduct the current and is U-shaped.

17. The electromagnetic component assembly of claim 16, wherein the inlet and the outlet are formed at a base of the first core and the second core.

18. The electromagnetic component assembly of claim 15, wherein the process fluid is a processing gas or a processing water mist and is the only media flowing through the tubular passageway and wherein the process fluid is provided from a heat sink of the power source to the inlet.

19. An electromagnetic component assembly disposed in a power source of a welding or cutting system, the electromagnetic component assembly comprising:
a first core and a second core;
a first tubular winding being placed between a first pair of parallel plates of the first core;
a second tubular winding being placed between a second pair of the parallel plates of the second core;
a center tap that includes a tube connecting the first tubular winding to the second tubular winding, wherein the first tubular winding and the second tubular winding are windings of a transformer; and
a third tubular winding wound around the second core and forms an inductor that controls or regulates a supply of electricity to a torch assembly,
wherein the first tubular winding and the second tubular winding conduct a current for an electromagnetic operation and comprise:
a passageway for a process fluid,
an inlet, at one end of the passageway, receiving the process fluid, and
an outlet, at another end of the passageway, directing the process fluid downstream toward the torch assembly, wherein the passageway enhances cooling of the electromagnetic component assembly as the process fluid travels through the passageway from the inlet to the outlet.

20. The electromagnetic component assembly of claim 19, wherein the process fluid is plasma gas and the torch assembly is a plasma arc torch assembly, and wherein, when the plasma gas reaches the plasma arc torch assembly, the plasma gas is ionized to create a plasma stream.

* * * * *